United States Patent [19]

McMahon

[11] 4,421,384
[45] Dec. 20, 1983

[54] FIBER OPTIC TRANSDUCER
[75] Inventor: Donald H. McMahon, Carlisle, Mass.
[73] Assignee: Sperry Corporation, New York, N.Y.
[21] Appl. No.: 286,812
[22] Filed: Jul. 27, 1981

Related U.S. Application Data

[63] Continuation of Ser. No. 63,504, Aug. 3, 1979, abandoned.

[51] Int. Cl.³ .......................... G02B 5/14; G01D 5/34
[52] U.S. Cl. ................................ 350/96.29; 250/227; 250/231 P
[58] Field of Search ............... 350/96.29, 96.15, 96.16; 372/108; 250/231 P, 227; 73/655

[56] References Cited
U.S. PATENT DOCUMENTS 3,166,673 1/1965 Vickery et al. .................... 331/94.5
3,500,240 3/1970 Kessler ............................. 372/108 X
3,775,699 11/1973 Cassels ............................. 331/94.5
4,053,764 10/1977 Sierak .............................. 350/96.15

Primary Examiner—John K. Corbin
Assistant Examiner—Rodney B. Bovernick
Attorney, Agent, or Firm—Howard P. Terry; Seymour Levine

[57] ABSTRACT

A fiber optic transducer is provided by cutting and polishing the ends of two optical fibers, having equal indexes of refraction, at angles with respect to their axis such that all light signals propagating within the optical fibers are incident to the end face at angles that are greater than the critical angle defined for an interface between a medium with an index of refraction equal to the index of refraction equal to that of an intervening medium between the two fibers. The two end faces so cut are positioned to be in a parallel relationship, a distance apart that is less than the wavelength of the light propagating within the input fibers. Variations of this distance with the pressure changes caused by the acoustic environment produces variations in the optical signal energy coupled from the input optical fiber to the output optical fiber, thus creating an amplitude modulated light beam that propagates in the output optical fiber.

7 Claims, 4 Drawing Figures

FIBER OPTIC TRANSDUCER

This application is a continuation, of application Ser. No. 63,504, filed Aug. 3, 1979, now abandoned.

BACKGROUND OF THE INVENTION

1. Field of the Invention

The present invention relates to transducers and, more particularly, to a transducer which converts small displacements into light intensity variations.

2. Description of the Prior Art

Underwater target locating systems may utilize active acoustic devices, which comprise a radiation source and a receiver to detect reflected sound energy, or passive devices which detect sound energy radiated from distant sources. The information obtained with active and passive systems is the same; mainly they determine the relative position of a multiplicity of disbursed discrete targets in a quiescent water ambient. Passive underwater locating systems are generally preferred for military applications. Since target position cannot be determined passively with a single acoustic receiver (hydrophone), a passive system requires a multiplicity of hydrophones, the minimum number to determine the position in one plane being three, one at each position at the vertices of an equiangular triangle. These systems determine the relative position of a target by frequency filtering the target signal received at each sensor from the background noise, determining the relative phases of the filtered signal between sensors, and processing this phase information to obtain the relative range and angle location. Large numbers of hydrophones, 100 and 1000, are typically utilized in a one or two dimensional array to provide sufficient system signal sensitivity in the presence of noise and to provide a desired angular resolution over a broad acoustic frequency band.

Acoustic transducers of the prior art utilize piezoelectric crystals or ferroelectric ceramics to transform acoustic signals into electrical signals by converting pressure variations into corresponding voltage variations across electrodes positioned on opposite sides of the material. These transducers typically supply very small voltages at very high impedance levels. Generally the transducer is coupled to an amplifier via a long wire or coaxial cable, the capacitance of which is charged by the voltage across the output terminals of the crystal, causing the voltage response, due to a given pressure wave, to be greatly reduced. This reduction in sensitivity may be eliminated by positioning a transimpedance amplifier in close proximity to the transducer which amplifies the signal and transforms the high output impedance of the transducer to a low impedance which is coupled to the input terminals of the transmission line. The transimpedance amplifier eliminates the decreased signal caused by the capacitance of the transmission line, thus permitting the amplified signal to be transmitted with little loss over long lengths of time.

Due to the complexity of hydrophone arrays their costs generally are excessive. Moreover, the large number of electronic components, each having finite failure rates, utilized in the array make it near impossible to maintain all parts of such a complicated system in perfect working order for more than a few hours. In view of the deficiencies of the prior art transducer, efforts have been expended to develop electrically passive acoustic transducers utilizing fiber optic techniques. Fiber optic systems eliminate active components at the transducer, provide higher bandwidth, smaller cable diameter, lower weight, and lower cost. Generally the effort expended on fiber optic transducers has been in the area of single mode interferometric devices. These devices, however, require long lived laser sources, single mode, single polarization fibers, and low loss single mode connectors, each of which require advances in the state of the art before practical elements utilizable in a fiber optic transducer system can be developed. Additionally, single mode interferometric systems exhibit relatively high sensitivity to ambient pressure head and temperature variations. Of all the problems that exist in prior art fiber optic sonar transducers, reduction of phase variations caused by the sensitivity of the single mode fiber to the same pressure head and temperature variations, is the most severe. Ambient phase variations produced in the fiber optic cable may be minimized by increasing the length of the fiber at the transducer. This increase, however, creates more severe pressure head and temperature induced phase variations in the transducer for which compensation via electrically active feed back control systems may be required. The limitations of single mode interferometric sensor systems are overcome with the present invention by utilizing multimode fibers and devising an intensity modulation technique that is compatible therewith.

SUMMARY OF THE INVENTION

A preferred fiber optic transducer constructed according to the principles of the present invention includes two optical fibers with the end faces thereof cut and polished at an angle with respect to their axes such that the light propagating in the fiber is incident to the end face at angles that are greater than the critical angle for the interface between the fiber medium and free space such that total internal reflection takes place at the interface. The axes of the two fibers are positioned on a common line with the canted end faces thereof in close proximity. This arrangement causes light propagating in the input fiber to be totally internally reflected by the canted end face if the spacing between the end faces is large compared to the free space wavelength of the propagating light. When the separation is less than approximately one wavelength, coupling between the fibers is realized with the coupled intensity increasing with decreasing separation. Ambient condition changes, such as pressure variations resulting from acoustic waves propagating in the vicinity of the pressure sensing device cause the pressure sensing device to create variations in the fiber end separations, thus producing an intensity modulation of the light coupled from the input through to the output optical fiber.

Further in accordance with the invention, a fiber optic transducer may include an optical fiber, one end of which is cut and polished at two angles of 45° with respect to the axis of the fiber, creating two end faces which form an apex angle on the axis that reflects light, after two reflections, back towards the input end of the fiber. An optical material, with a refractive index substantially equal to refractive index of the fiber, is positioned such that one surface is substantially parallel to one of the end faces with a separation therebetween. When the separation between the one end face and the surface of the optical material is greater than a wavelength of the optical signals propagating within the fiber, the optical signals incident to the one end face will be totally reflected therefrom towards the second end face and therefrom towards the input end of the fiber. When the separation between the one end face and the optical material is less than a wavelength of the propagating signals, light energy is coupled to the optical material, the percentage of the incident energy coupled increasing with decreasing separation, thus reducing the intensity of the light returned to the input end. Placing the optical fiber and the optical material in a device that causes variations in the distance between the one end face and the optical material as a result of ambient condition changes will cause a variation in the intensity of the light beam that is reflected towards the input end.

DESCRIPTION OF THE PREFERRED EMBODIMENTS

When light is propagated from an optically denser medium into one which is optically less dense, as for example, from a medium with refractive index n, greater than one, to an air medium with refractive index one, at an angle of incidence $\psi_i$ to the boundary of the media that is greater than the critical angle $\psi_c$ defined by $\sin \psi_c = 1/n$, no light enters the second medium. All the incident light is reflected back into the first medium and the total internal reflection occurs. The electric field in the second medium, however, does not disappear, only there is no longer a flow of energy across the boundary. Under these circumstances, a non-homogeneous wave is propagated along the boundary in the plane of incidence, the amplitude of which decays expedentially with the distance from the boundary. This amplitude decreases very rapidly with the depth of penetration, the effective depth of penetration being of the order of a wave length $\lambda$ of the light incident to the boundary.

Figure 1:
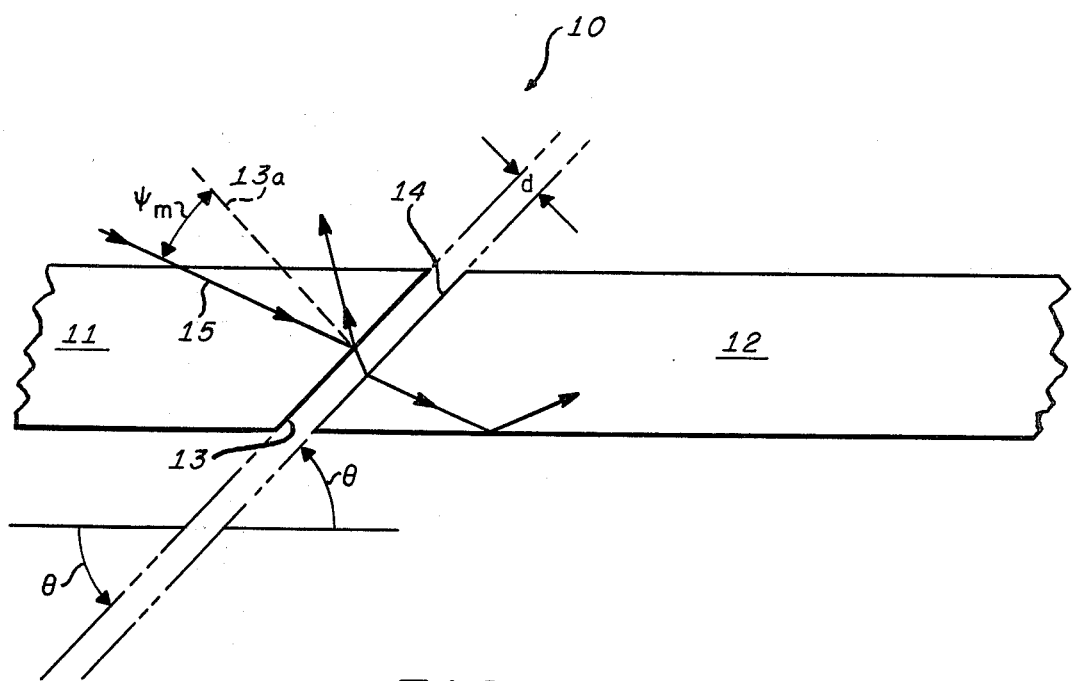
FIG. 1, useful for explaining the invention, is a representation of two optical fibers with end faces cut at an angle with respect to the fiber axes and separated by a given distance.

Refer to FIG. 1 which schematically shows the structure of a junction 10 that may be utilized as a central component of the invention. Two optical fibers 11 and 12 each with an index of refraction $n_1$ are cut and polished at their ends to establish end faces 13 and 14 at an acute angle $\theta$ with the respective fiber axis. The fibers are positioned with the end faces 13 and 14 spaced a small distance d apart and the axes desirably located along a common line. If the spacing "d" is large compared to a wave length and the angle $\theta$ is selected such that the minimum incident angle $\psi_m$, relative to the normal line 13a, of an optical signal to the end face 13, along for example, the propagation path 15, is greater than the critical angle, all optical signals propagating within the fiber 11 will be internally reflected. If the distance d is decreased to be less than a wavelength, some fraction of the light will be transmitted through the gap to enter and propagate in the optical fiber 12. The percentage of light transmitted to the optical fiber 12, for each angle of incidence greater than the minimum angle $\psi_m$, may be determined from:

$$T = 1 - \left| \frac{(\mu^2 + \omega^2)^2}{(\mu^2 - \omega^2)^2 + 4\mu^2\omega^2 \coth^2 \beta d} \right|$$

Where for perpendicular polarization $$\mu^2 = n^2 \cos^2 \psi$$

$$\omega^2 = n^2 \sin^2 \theta - 1$$

$$\beta = \frac{2\pi}{\lambda} \sqrt{n^2 \sin^2 \theta - 1}$$

and for parallel polarization $$\mu^2 = \frac{\cos^2 \psi}{n^2}$$

$$\omega^2 = n^2 \sin^2 \theta - 1$$

$$\beta = \frac{2\pi}{\lambda} \sqrt{n^2 \sin^2 \theta - 1}$$

Figure 2:
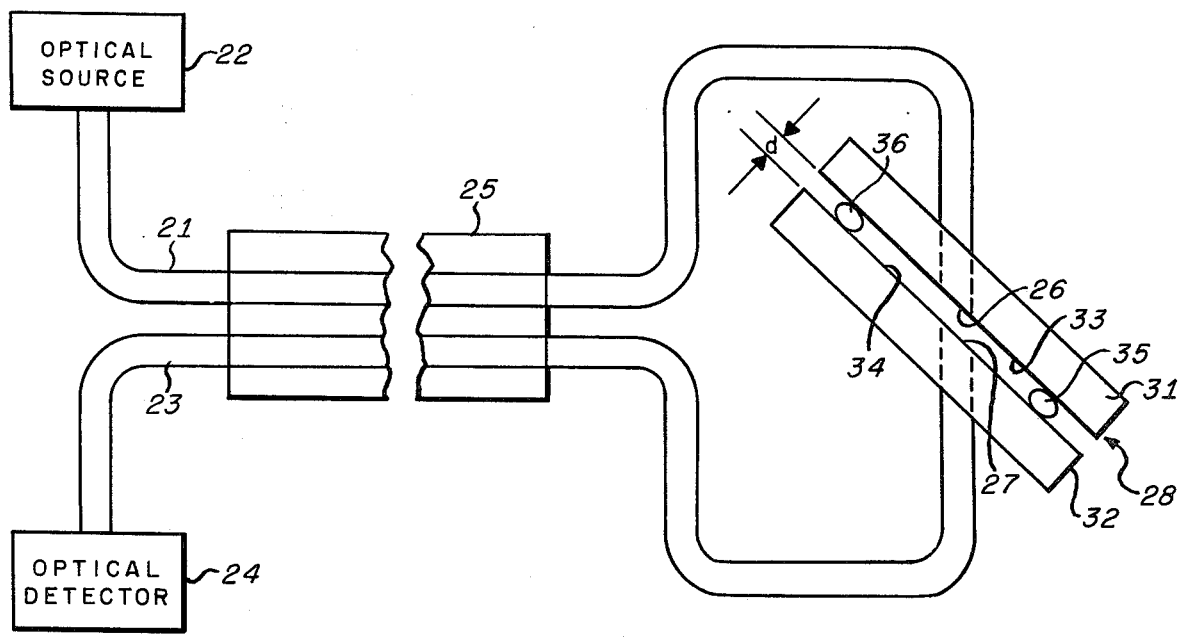
FIG. 2 is a schematic representation of a one embodiment of the invention.

Referring to FIG. 2, a fiber optic sonar transducer 20 may comprise an input optical fiber 21 coupled at the input end to an optical source 22 and an output optical fiber 23 coupled at the output end thereof to an optical detector 24. The output end face 26 of input fiber 21 and the input end face 27 of output fiber 23 are cut and polished at an angle for total internal reflection as previously described. Fibers 21 and 23 may extend through a cable 25 respectively to plates 31 and 32 of a sensor 28, which may, for example, be a two plate pressure sensing device, whereat the end faces 26 and 27 are held flush with the edges 33 and 34 of the plates 31 and 32 respectively. Edges 33 and 34 are held parallel while the distance therebetween is allowed to vary, as a function of pressure from very small fractions of a free space wavelength to approximately one wavelength by compliance members 35 and 36. With this arrangement an acoustic wave incident to the pressure sensor 28 causes a variation in the distance between the surfaces 33 and 34 of the plates 31 and 32, thereby varying the total light energy transmitted from the end space 26 of the input optical fiber 21 through the end face 27 of the output optical fiber 23, thus causing the light signals incident to the optical detector 24 to be amplitude modulated.

Figure 3:
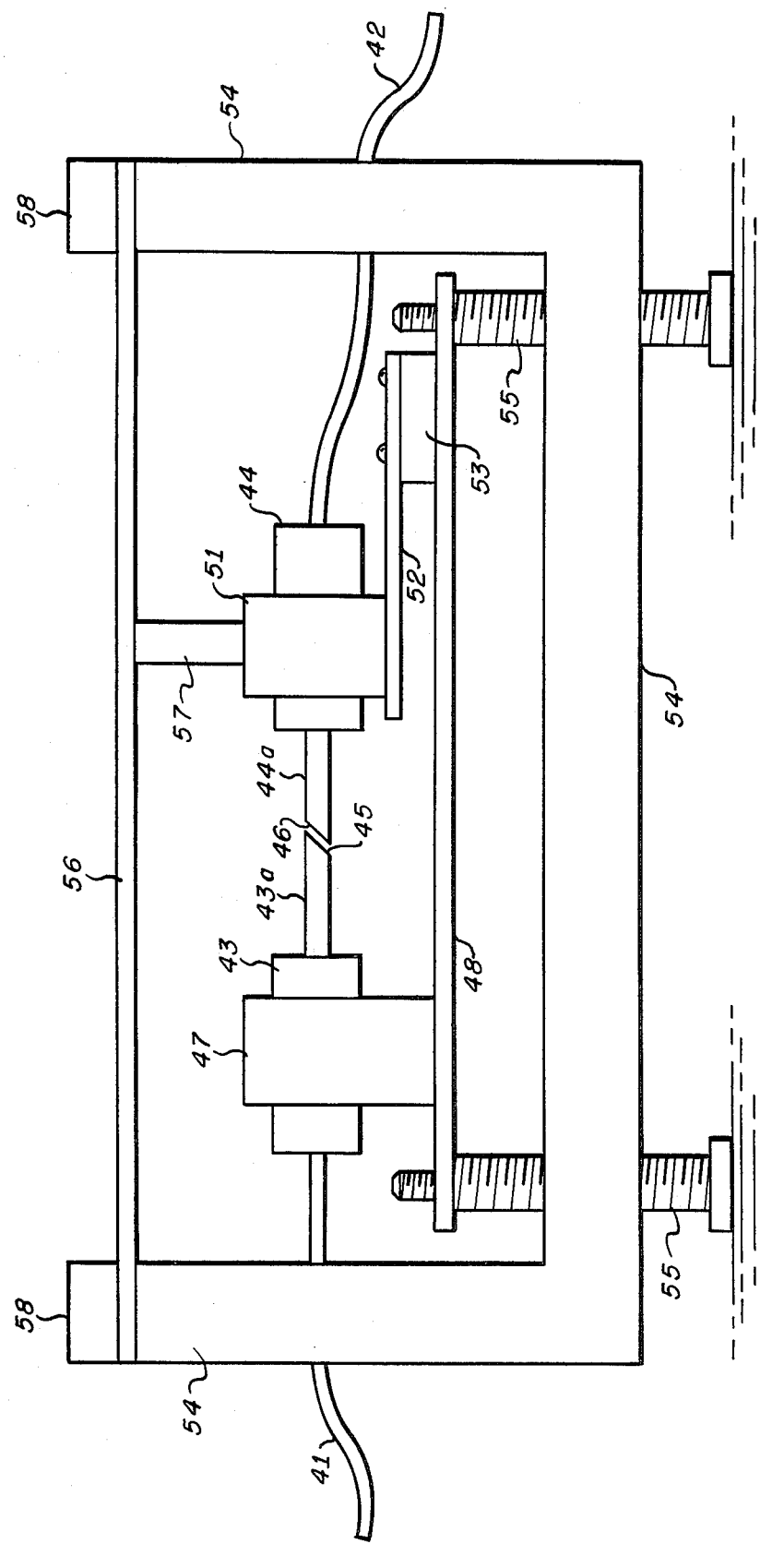
FIG. 3 is a schematic representation of a second embodiment of the invention.

Another embodiment of the invention is shown in FIG. 3. An input optical fiber 41 and an output optical fiber 42 may be inserted into brass ferrules 43 and 44 and along the entire length of cantilevered extensions 43a and 44a thereof respectively and bonded therein, as for example with Torr Seal Epoxy. The ends of the cantilevered extensions 43a and 44a may then be cut and polished such that end faces 45 and 46 of the fibers 41 and 42 respectfully form a desired acute angle with the fiber axis as previously described. Ferrule 43 may be secured in a holder 47 which in turn may be bonded to a base plate 48, while ferrule 44 may be secured in a holder 51 which in turn may be attached near one end of a spring 52. Spring 52 may be secured at the other end to a spacing block 53, the height of which is adjusted to obtain proper alignment of the end faces 45 and 46 and positioned on the base plate 48 to obtain a desired spacing between end faces 45 and 46. Base plate 48 may be placed in a housing 54 on adjusting screws 55 extending through the base of the housing 54. Holder 51 may be coupled to a diaphram 56 via plunger 57. Diaphram 56 may be sealed to the housing 54 with a retaining ring 58. Maximum sensitivity to the diaphram pressure may be obtained by adjusting the screws 55 in the base of the housing 54. In operation optical signals are caused to propagate through input fiber 41 towards the end face 45 thereof. Variations in ambient conditions, as for example pressure, applied through the diaphram 56 cause variations in the spacings between the end faces 45 and 46 thus resulting in the propagation of an amplitude modulated optical signal in the output fiber 42 as previously described.

Figure 4:
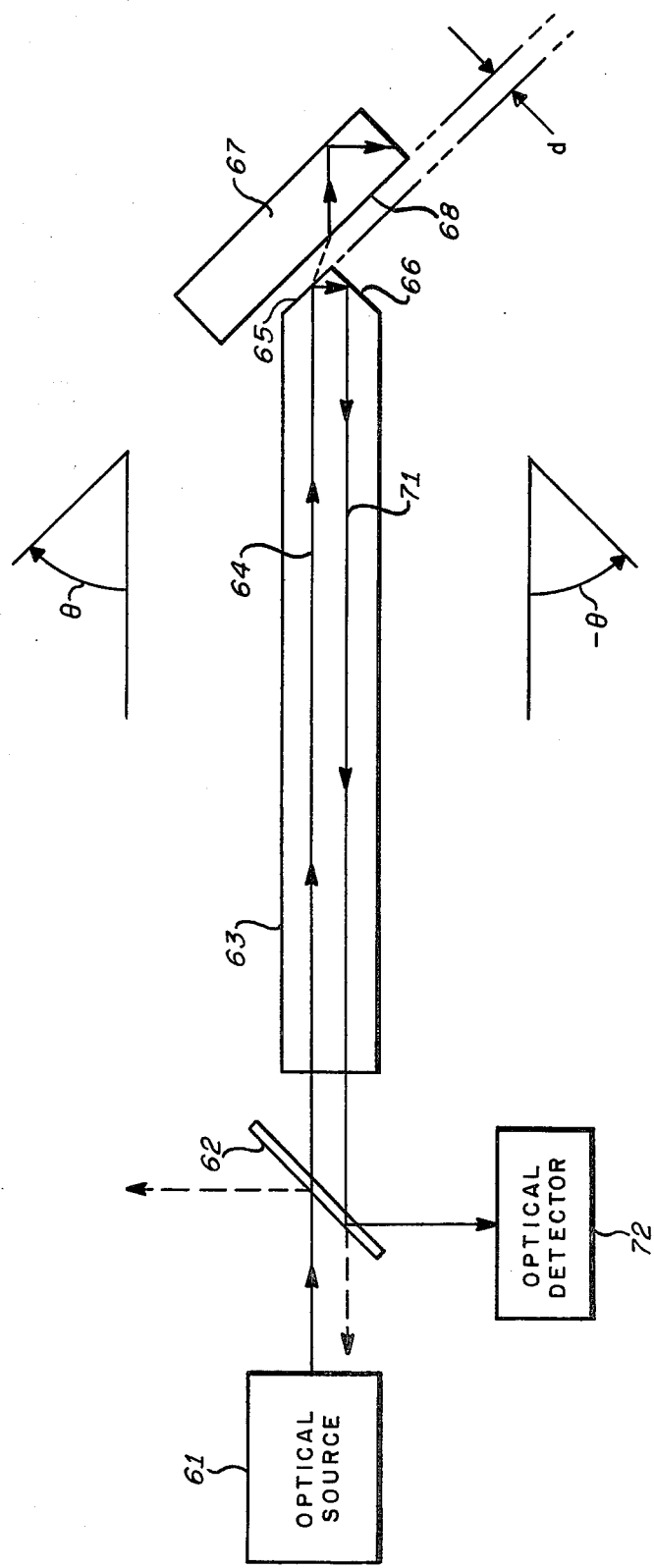
FIG. 4 is a schematic representation of a third embodiment of the invention.

A single fiber acousto-optic transducer in accordance with the present invention is shown schematically in FIG. 4. Optical signals from an optical source 61 are coupled through a beam splitter 62 and caused to propagate in an optical fiber 63 along a path 64, for example. Optical fiber 63 is cut and polished to establish end faces 65 and 66 which form angles of 90° with respect to each other and 45° with respect to the axis of the optical fiber 63. The numerical aperture of the fiber is limited to a value such that the angle of incidence to the end faces 65 and 66 for substantially all permissible propagation paths within the optical fiber 63 are greater than the critical angle for the interface between a medium having an index of refraction of fiber 63 and air. A block of optical material 67 having an index of refraction approximately equal to or greater than the index of refraction of the fiber core 63 is positioned such that a flat surface 68 thereof is substantially parallel to an end face of the optical fiber 63, as for example, end face 65, with a spacing d therebetween. When the spacing d is less than a wavelength of the optical signal propagating within the optical fiber 63, light incident to the end face 65, as for example along the optical path 64, is reflected therefrom to be incident to the end face 66, and reflected from the end face 66 towards the input end of the fiber, as for example along the path 71. Reflected light emerging from the optical fiber 63 is then incident to the beam splitter 62 and a portion thereof is reflected towards an optical detector 72. As the distance between the end face 65 and the surface 68 decreases, increasing proportions of optical energy are coupled across the gap into the optical material 67, causing the optical energy reflected from the end face 65, towards the end face 66 to decrease, thus resulting in a decrease in the optical signal detected by the optical detector 72. It should be apparent to those skilled in the art that positioning the optical material 67 and the optical fiber 63 in the ferrules 43 and 44 of FIG. 3 and locating the device so formed in an acoustic field will result in an amplitude modulated light beam incident to the optical detector 72.

While the invention has been described in its preferred embodiments, it is to be understood that the words that have been used are words of description rather than of limitation and that changes within the purview of the appended claims may be made without departing from the true scope and spirit of the invention in its broader aspects.

It is claimed:

1. A fiber optic transducer for sensing ambient conditions comprising:
   first and second optical fibers constructed of optical transparent material with substantially equal refractive indices $n_1$, each having a longitudinal axis and a planar end face oriented at a preselected angle with respect to said longitudinal axis;
   means for positioning said optical fibers with said longitudinal axes in substantial alignment and said end faces in substantially parallel relationship with a separation space having a variable separation distance therebetween that changes as a function of said ambient conditions; and
   an optical transparent medium with refractive index $n_2$ less than $n_1$ substantially spanning said variable separation space, said refractive indices $n_1$ and $n_2$ and said preselected angle chosen such that optical signals propagating in said first optical fiber are incident to said planar end face thereof at angles of incidence that are at least equal to a critical angle $\theta_C$, defined by $\sin \theta_C = n_2/n_1$, such that optical signals incident to said planar end face of said first optical fiber with wavelengths shorter than said variable separation distance are substantially totally reflected and optical signals incident to said planar end face with wavelengths greater than said variable separation distance are coupled across said variable separation distance to propagate in said second optical fiber with an intensity level that varies inversely with said variable separation distance.

2. A fiber optic transducer in accordance with claim 1 wherein said positioning means includes:
   first and second plates adapted for extending said first and second optical fibers therethrough; and
   means for maintaining said end faces of said first and second optical fibers in said substantially parallel relationship and for providing said variable spacing therebetween.

3. A fiber optic transducer in accordance with claim 1 wherein said positioning means comprises:
   first and second means for holding said first and second optical fibers respectively;
   spring means for resiliently mounting said second holding means,
   means for mounting said first holding means and said spring means such that said end faces are positioned in said substantially parallel relationship with said separation therebetween; and
   means for sensing ambient conditions and for transmitting to said resiliently mounted second holding means incremental displacements caused thereby.

4. A fiber optic transducer in accordance with claim 3 further including a housing having a base and a circumferential wall with a top thereon about an internal volume wherein said mounting means with said first holding means and said spring mounted second holding means are adjustably set on said base and whereon said ambient condition sensing means is attached to said top of said circumferential wall and freely extends across said internal volume.

5. A fiber optic transducer in accordance with any one of claims 1, 2, 3 or 4 wherein said index of refraction $n_2$ is substantially equal to one.

6. A fiber optic transducer for sensing ambient conditions comprising:
   an optical fiber having a longitudinal axis, a numerical aperture, and refractive index $n_1$, extending from an input end to first and second planar end faces that form equal and opposite predetermined angles with respect to said longitudinal axis thereby establishing an angle between said first and second end faces that is twice said predetermined angle;

an optical material having a planar surface and a refractive index at least equal to said refractive index $n_1$ positioned such that said planar surface is substantially in parallel relationship with said first end face and separated therefrom by a separation distance variable as a function of said ambient conditions; and transparent optical medium with refractive index $n_2$ less than $n_1$ adjacent to said first and second end faces and substantially spanning said variable separation distance, said refractive indices $n_1$ and $n_2$, said numerical aperture, and said predetermined angle selected such that optical signals propagating in said optical fiber are incident to said first end face at angles of incidence at least equal to a critical angle $\theta_C$, defined by sin $\theta_C = (n_2/n_1)$, at which said optical signals experience substantially total internal reflection, such that said incident optical signals are substantially totally reflected from said first end face towards said second end face and therefrom towards said input end when said incident optical signals have wavelengths that are shorter than said variable separation distance, and coupled across said separation distance to said transparent optical medium with an intensity level that varies inversely with said variable separation distance, when said incident optical signals have wavelengths that are greater than said variable separation distance resulting in variations of optical signal intensity reflected to and from said second end face.

7. A fiber optic transducer in accordance with claim 6 further including:

means for coupling an incident optical signal to said optical fiber at said input end and for deflecting optical signals reflected from said input end in a predetermined direction; and means for detecting said optical signals reflected in said predetermined direction.

* * * * *